(12) United States Patent
Ikeda et al.

(10) Patent No.: US 9,172,837 B2
(45) Date of Patent: Oct. 27, 2015

(54) LIGHT SOURCE FOR EXPOSURE AND IMAGE FORMING APPARATUS

(71) Applicant: CANON KABUSHIKI KAISHA, Tokyo (JP)

(72) Inventors: Kouji Ikeda, Inagi (JP); Takanori Yamashita, Hachioji (JP); Masami Iseki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/473,943

(22) Filed: Aug. 29, 2014

(65) Prior Publication Data

US 2015/0062669 A1 Mar. 5, 2015

(30) Foreign Application Priority Data

Sep. 2, 2013 (JP) ................................. 2013-181015

(51) Int. Cl.
*H04N 1/04* (2006.01)
*H04N 1/028* (2006.01)

(52) U.S. Cl.
CPC ................................. *H04N 1/02845* (2013.01)

(58) Field of Classification Search
CPC .................... G09G 3/3233; G09G 2320/0233; G02B 6/0083; G02B 6/0031; G02B 6/0048; G02B 6/0071; G02B 6/0085; G02B 6/0091; G02F 1/133603; G02F 1/133608; H04N 1/00; H04N 1/0083; H04N 5/64; F21K 9/135

USPC ......... 345/76, 204, 205, 55, 690, 77, 92, 207, 345/80, 82, 83; 347/130, 237, 11, 131, 132, 347/133, 238, 241, 9; 358/1.1, 1.15, 475, 358/474, 509; 348/E5.096, 725
See application file for complete search history.

(56) References Cited

U.S. PATENT DOCUMENTS

| 8,384,626 | B2 * | 2/2013 | Yamamoto et al. | 345/76 |
| 8,464,653 | B2 * | 6/2013 | Ebisawa | 118/313 |
| 8,847,935 | B2 * | 9/2014 | Yamashita et al. | 345/205 |
| 2009/0109208 | A1 * | 4/2009 | Yamashita et al. | 345/214 |
| 2009/0219234 | A1 * | 9/2009 | Yamamoto et al. | 345/80 |
| 2010/0214626 | A1 * | 8/2010 | Tsuchiya et al. | 358/461 |
| 2012/0112642 | A1 * | 5/2012 | Ikeda | 315/161 |
| 2014/0035965 | A1 * | 2/2014 | Toyomura et al. | 345/690 |

FOREIGN PATENT DOCUMENTS

JP 2006-123493 A 5/2006

* cited by examiner

*Primary Examiner* — Negussie Worku
(74) *Attorney, Agent, or Firm* — Canon U.S.A., Inc. IP Division

(57) ABSTRACT

Provided is a light source for exposure including: a circuit section which includes plural pixel circuits arranged in one direction, a scanning circuit which outputs a scanning signal, a scanning line which supplies the pixel circuits with the scanning signal; light-emitting elements connected to the pixel circuits; and data lines which supply a lead wire with a data signal via the pixel circuits, wherein a data line group including the plural data lines, a light-emitting element group including the plural light-emitting elements, and the circuit section are arranged in this order in a direction perpendicular to a direction in which the plural pixel circuits are arranged.

11 Claims, 4 Drawing Sheets and an image forming apparatus.

LIGHT SOURCE FOR EXPOSURE AND IMAGE FORMING APPARATUS

BACKGROUND OF THE INVENTION

1. Field of the Invention

The present invention relates to a light source for exposure and an image forming apparatus.

2. Description of the Related Art

A light source for exposure in which light-emitting elements, such as organic electroluminescence (EL) elements, are used is mounted on a printer or other devices. In the light source for exposure, plural pixels having light-emitting elements are arranged linearly on a substrate. Therefore, the light source for exposure is long in a direction in which the pixels are arranged and is high in aspect ratio. In a case in which a data line is disposed along a longitudinal direction of the light source for exposure, the data line becomes long and parasitic capacitance is likely to be large. However, it is necessary to decrease parasitic capacitance in order to perform high speed driving. Japanese Patent Laid-Open No. 2006-123493 discloses a configuration of a light source for exposure in which parasitic capacitance of a data line is decreased.

However, in the configuration disclosed in Japanese Patent Laid-Open No. 2006-123493, since a scanning line and a data line cross each other and parasitic capacitance is formed at the crossing point, there is a problem that further speeding-up in driving is difficult.

SUMMARY OF THE INVENTION

An object of the present invention is to provide a light source for exposure in which parasitic capacitance in a circuit for driving a light-emitting element is decreased.

The present invention provides a light source for exposure, including: a circuit section which includes plural pixel circuits arranged in one direction, a scanning circuit configured to output a scanning signal, and a scanning line configured to supply the plural pixel circuits with the scanning signal; plural light-emitting elements connected to the plural pixel circuits; and plural data lines configured to supply the plural pixel circuits with a data signal via lead wires, wherein a data line group including the plural data lines, a light-emitting element group including the plural light-emitting elements, and the circuit section are arranged in this order in a direction perpendicular to a direction in which the plural pixel circuits are arranged.

Further features of the present invention will become apparent from the following description of exemplary embodiments with reference to the attached drawings.

DESCRIPTION OF THE EMBODIMENTS

Hereinafter, the present invention will be described in detail with reference to the drawings.

Light Source for Exposure

First Embodiment

Figure 1:
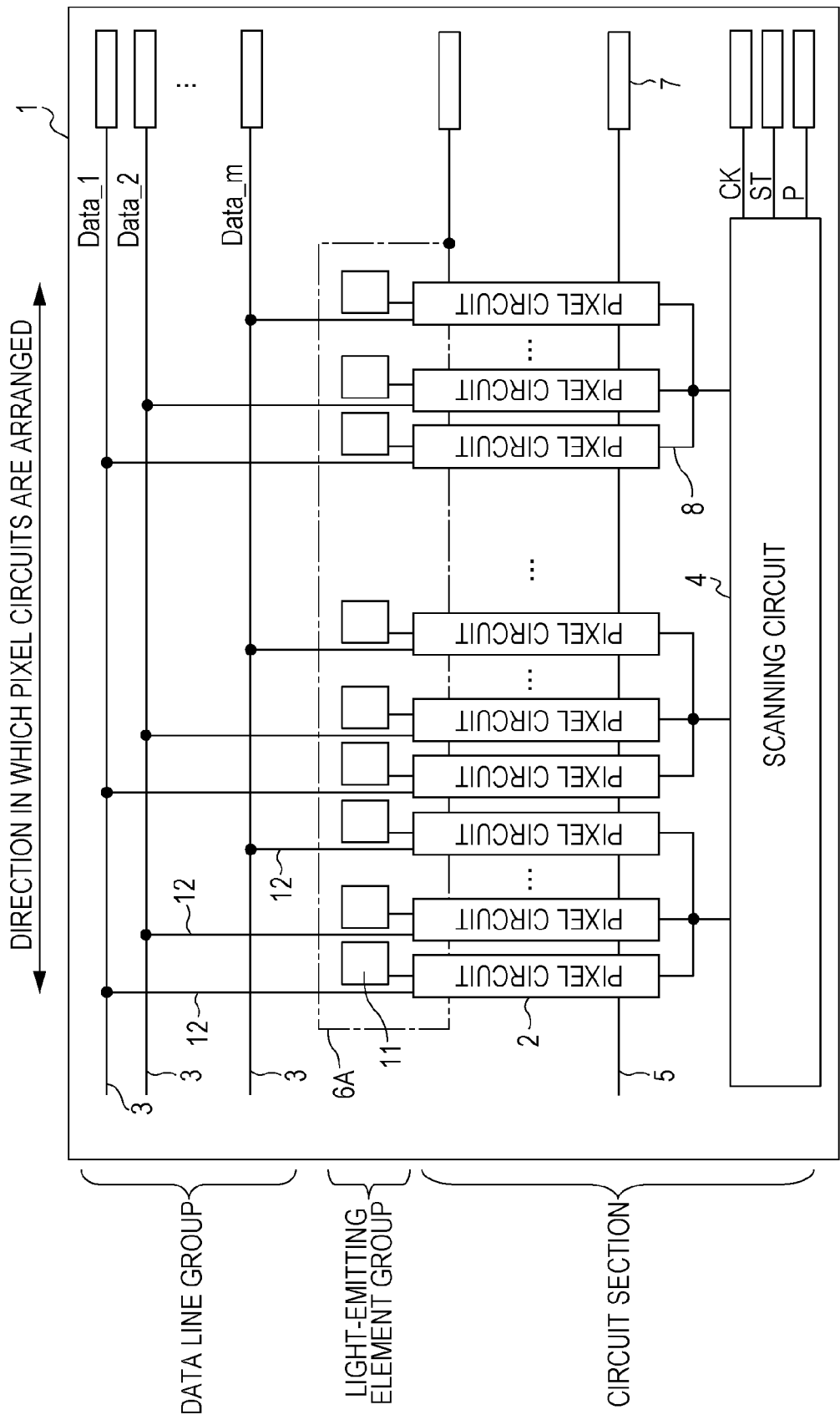
FIG. 1 is a schematic diagram illustrating an exemplary configuration of a light source for exposure of the present invention.

An exemplary light source for exposure according to the present invention for exposing a latent image by illuminating a photoconductive drum with light will be described with reference to FIG. 1. FIG. 1 is a schematic diagram illustrating a configuration of a light source for exposure according to the present embodiment.

In the light source for exposure of the present invention, plural pixel circuits 2 are formed and arranged in one direction on a substrate 1. As the substrate 1, a glass substrate, a silicon substrate and the like may be used. A light-emitting element 11 is connected to each of the pixel circuits 2. The pixel circuit 2 and the light-emitting element 11 constitute a pixel. The light-emitting elements 11 are arranged in one direction that is the same as the direction in which the pixel circuits 2 are arranged. It is not necessary, however, that the light-emitting elements 11 are arranged in one direction, but they may be arranged in, for example, a staggered pattern. As the light-emitting element 11, light emitting diode (LED), an inorganic EL device, an organic EL device and the like may be used.

The length of the pixel circuit 2 in the direction in which the pixel circuits 2 are arranged is longer than the length of the pixel circuit 2 in the direction perpendicular to the direction in which the pixel circuits 2 are arranged. The pixel circuit 2 illustrated in FIG. 1 has a substantially rectangular shape. The pixel circuits 2 form plural blocks each of which is constituted by adjacent plural pixel circuits 2. In particular, m adjacent pixel circuits 2 form a block (m is an integer equal to or greater than 2) and the total of N blocks (N is an integer equal to or greater than 2) are arranged. The blocks are arranged in a direction that is the same as the direction in which the pixel circuits 2 are arranged.

In the present embodiment, m data lines 3 for transmitting data signals are arranged corresponding to the number of the pixel circuits 2 that constitute one block. The data lines 3 and the pixel circuits 2 are connected by lead wires 12. In the present embodiment, N lead wires 12 are connected to each data line 3 corresponding to the number of blocks and data signals are supplied to the pixel circuits 2 of each block. In the present embodiment, the data lines 3 are wired in the direction in which the pixel circuits 2 are arranged and the lead wires 12 are wired in the direction perpendicular to the direction in which the pixel circuits 2 are arranged.

Control signals, such as clock signals CK and CKB, gate signals ST and P and the like, are input in a scanning circuit 4 which outputs scanning signals to a scanning line 8 for each block and supplies the pixel circuits 2 with scanning signals. Inside the scanning circuit 4, a shift register is included. The scanning signals are output after timing thereof is shifted in block units. The shift register inside the scanning circuit 4 is disposed so that the signals proceed in the direction in which the pixel circuits 2 are arranged. Although one kind of scanning signal is input in the pixel circuit 2 via one scanning line 8 in the configuration illustrated in FIG. 1, the number of the scanning lines 8 is not limited to the same.

Here, desirably, the smaller the area of the light source for exposure, the greater number of the light sources for exposure may be manufactured during mass production, whereby the cost is reduced. Since a fluctuation in especially the length of the width direction of the light source for exposure has a significant influence on the area, it is desirable to shorten this length as much as possible. At the same time, it is required for the light source for exposure to be driven at a high speed for, for example, an increase in the printing speed. In order to implement these, driving in block units in which data is written collectively in plural pixels via plural data lines is desirably performed.

A power supply voltage is supplied to all the pixel circuits 2 and the light-emitting elements 11 via a first power supply wire 5 and second power supply wires. Plural second power supply wires are disposed in an area 6A which is provided to overlap the light-emitting elements 11 and the pixel circuits 2. The second power supply wires are formed in a layer in this area 6A that is different from a layer in which the wirings of the data lines 3, the lead wires 12 and the pixel circuits 2 are formed. The signals and the power supply voltage described above are supplied to the substrate 1 from each terminal section 7. The layer on which the second power supply wires are formed is changed into another layer at a position near the terminal sections 7 and the second power supply wires are connected to the terminal sections 7.

As illustrated in FIG. 1, in the light source for exposure of the present invention, a data line group including plural data lines 3, a light-emitting element group including plural light-emitting elements 11, and a circuit section including the pixel circuits 2, the scanning circuit 4 and the scanning lines 8 are arranged in this order in the direction perpendicular to the direction in which the pixel circuits 2 are arranged. Since the circuit section includes the pixel circuits 2 and the scanning circuit 4 and the data line group is disposed in an area different from the area of the circuit section, the scanning lines 8 are connected to the pixel circuits 2 without crossing the data lines 3. Therefore, parasitic capacitance of the data lines 3 may be decreased. In the present embodiment, the pixel circuits 2 and the scanning circuit 4 are arranged in this order in the direction perpendicular to the direction in which the pixel circuits 2 are arranged from the side of the light-emitting elements 11. Further, in the present embodiment, the circuit section includes the first power supply wire 5 to which a first voltage is applied. The first power supply wire 5 is disposed in the pixel circuits 2 on the side of the scanning circuit 4. With this configuration, the lead wires 12 are connected to the pixel circuits 2 without crossing either the first power supply wire 5, the scanning lines 8 or the scanning circuit 4. Therefore, parasitic capacitance of the lead wire 12 may be decreased. Although the lead wires 12 cross the second power supply wires in the area 6A, parasitic capacitance may be decreased by, for example, providing a flattening film between the lead wires 12 and the second power supply wires to separate the layer on which the lead wires 12 are formed from the layer on which the second power supply wires are formed.

Since the light-emitting element group is disposed between the data line group and the circuit section in the light source for exposure of the present invention, the length of the substrate 1 in the direction perpendicular to the direction in which the pixel circuits 2 are arranged may be shortened. That is, since the light-emitting elements, especially the organic EL devices, are generally likely to deteriorate on contact with moisture content and oxygen, the light-emitting elements are sealed with a sealing member, such as cap glass and a thin layer, to shield them from the moisture content and oxygen. In that case, a certain amount of a sealing space is required on the periphery of the light-emitting element as a contact region between the sealing member and the substrate 1. In the light source for exposure of the present invention, it is possible to provide the sealing space by overlapping the data line groups located on both sides of the light-emitting element group and overlapping the circuit section. With this configuration, it is not necessary to provide a sealing space separately and thus the length of the substrate 1 in the direction perpendicular to the direction in which the pixel circuits 2 are arranged may be shortened.

Here, in order to use the areas on both sides of the light-emitting element group as the sealing space, it is desirable to dispose the light-emitting element 11 at a position as near the center as possible of the substrate 1 in the direction perpendicular to the direction in which the pixel circuits 2 are arranged. From this viewpoint, it is desirable that the length of the data line group in the direction perpendicular to the direction in which the pixel circuits 2 are arranged is longer than the length of each of the scanning circuit 4, the pixel circuits 2 and the first power supply wire 5 in the direction perpendicular to the direction in which the pixel circuits 2 are arranged. That is, it is possible to dispose the light-emitting element 11 at a position as near the center as possible by disposing, collectively on one side of the light-emitting element group, the scanning circuit 4 and the like of which length in the direction perpendicular to the direction in which the pixel circuits 2 are arranged is shorter than the length of the data line group.

Figure 2:
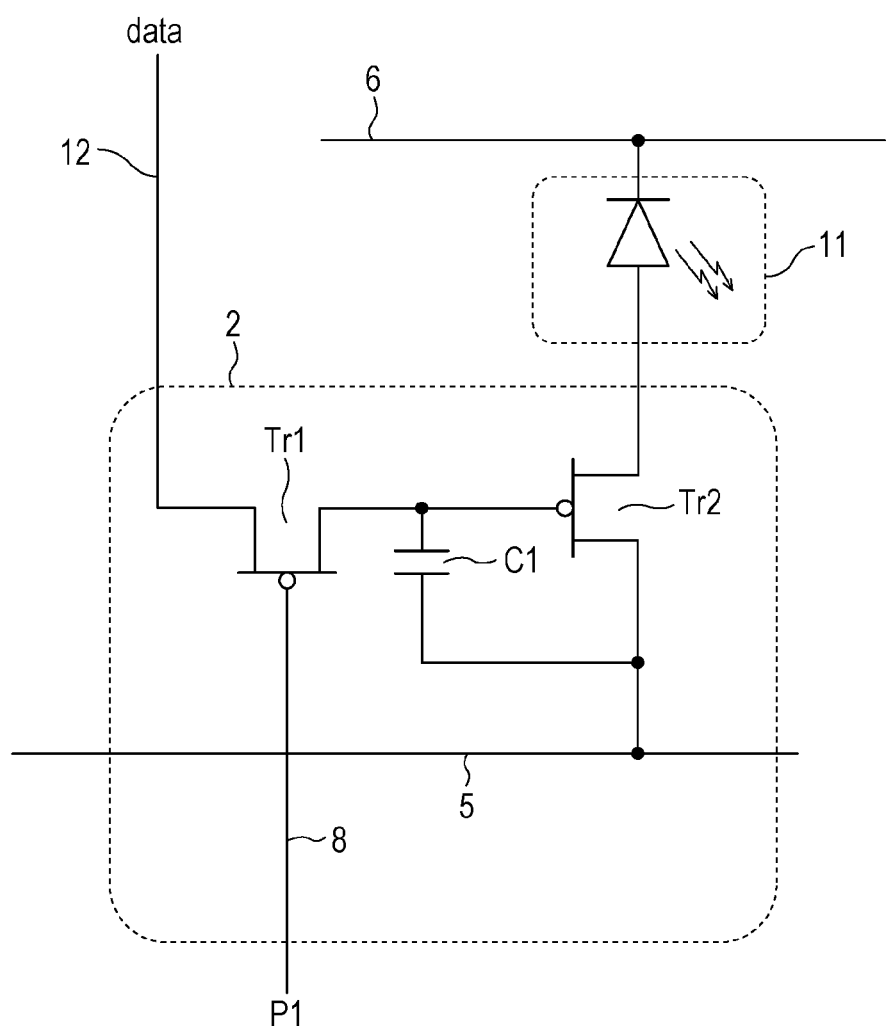
FIG. 2 is an exemplary diagram illustrating a pixel circuit.

FIG. 2 is an exemplary diagram illustrating the pixel circuit which consists of the pixel circuit 2 and the light-emitting element 11. A circuit configuration will be described. The pixel circuit 2 is constituted by two PMOS transistors and one storage capacitance C1. A scanning signal P1 is input in a gate electrode of a switching transistor Tr1 which is a selection transistor and a data line 3 is connected to either a source or a drain. The other of the source or the drain is connected to a gate of a driving transistor Tr2 which supplies the light-emitting element 11 with a driving current. A source of the driving transistor Tr2 is connected to the first power supply wire 5 and a drain of the driving transistor Tr2 is connected to an anode electrode of the light-emitting element 11. Storage capacitance C1 is disposed between the gate and the source of the driving transistor Tr2, and a data voltage written in the pixel circuits 2 is retained. A cathode of the light-emitting element 11 is connected to a second power supply wire 6 which is a common electric potential provided common to all the pixels. Either the anode electrode or the cathode electrode is formed of a transparent electrode (for example, indium tin oxide (ITO) or indium zinc oxide (IZO)) to be used as a light extraction surface. Although a power supply voltage is applied to the first power supply wire 5 and the second power supply wire 6 is used for the ground (GND) in FIG. 2, a circuit configuration in which the first power supply wire 5 is used for the GND and the power supply voltage is applied to the second power supply wire 6 may also be employed.

A circuit action will be described. The switching transistor Tr1 is turned on at a timing at which data corresponding to the pixel is set to data line 3. Then data is written in the storage capacitance C1. Then data is retained in the pixel circuit 2 when the switching transistor Tr1 is turned off. At the same time, a current in accordance with a gate-source voltage of the driving transistor Tr2 flows into light-emitting element 11 from the driving transistor Tr2. Although an example in which the pixel circuits 2 are constituted by PMOS is illustrated in the present embodiment, the pixel circuits 2 are not limited to this transistor (Tr) polarity. In particular, a circuit constituted by a single channel of NMOS and a circuit constituted by both NMOS and PMOS may be employed.

Although the kind of the light-emitting element is not limited in the embodiment described above, the present invention is used suitably for a light source for exposure which controls lighting of an organic EL device.

Second Embodiment

Figure 3:
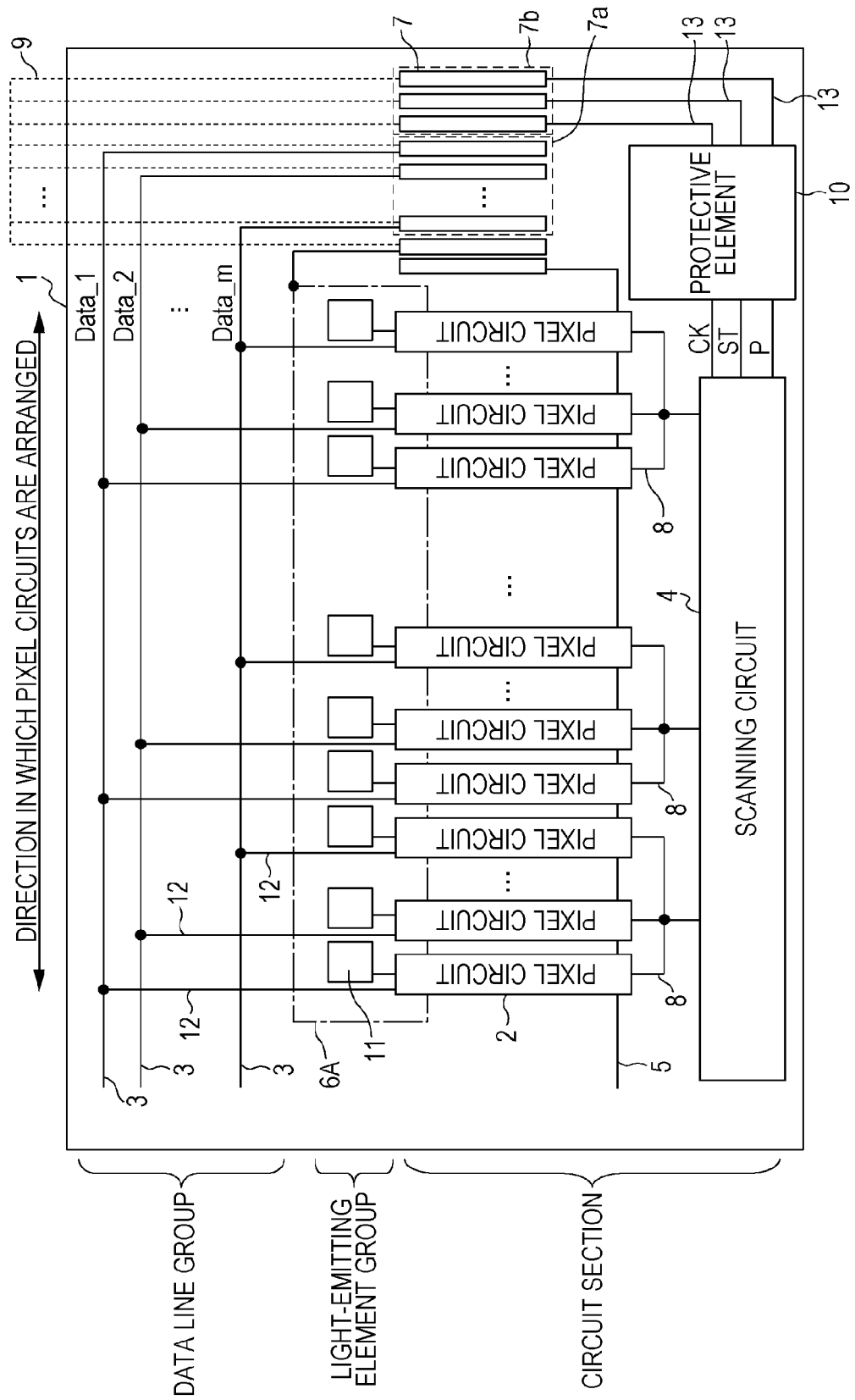
FIG. 3 is a schematic diagram illustrating another exemplary configuration of a light source for exposure of the present invention.

Another exemplary light source for exposure of the present invention will be described with reference to FIG. 3. FIG. 3 is a schematic diagram illustrating a configuration of a light source for exposure according to the present embodiment.

In the present embodiment, an electrostatic discharge (ESD) protective element as a protective element 10 is provided between terminal sections 7 and a scanning circuit 4 to prevent the scanning circuit 4 from being damaged by static electricity. The configuration of the present embodiment includes a short ring 9 which connects terminal sections 7 with low resistance wiring so that both terminal sections 7 have the same potential and protects a substrate 1 from static electricity in a manufacturing process. The short ring 9 is cut along a cutting line that corresponds to an end portion of the substrate 1 on completion of the light source for exposure so that the terminal sections 7 are separated from one another.

As illustrated in FIG. 3, the terminal sections 7 are arranged in the direction in which the pixel circuits 2 are arranged at a position outside a pixel area (i.e., an area in which pixels constituted by pixel circuits 2 and light-emitting elements 11 are arranged) and outside an area of the pixel area on an extension line in the direction perpendicular to the direction in which the pixel circuits 2 are arranged. The terminal section 7 includes a first terminal section group 7a connected to data lines 3 and a second terminal section group 7b connected to a scanning circuit 4. The first terminal section group 7a is disposed on the side of the pixel circuit 2 with respect to the second terminal section group 7b.

The data lines 3 are wired from the first terminal section group 7a in the direction perpendicular to the direction in which the pixel circuits 2 are arranged, then bent perpendicularly and wired in the direction in which the pixel circuits 2 are arranged in an area of the pixel area on the extension line in the direction perpendicular to the direction in which the pixel circuits 2 are arranged. Signal lines 13 which connect the scanning circuit 4 and the second terminal section group 7b via a protective element 10 are wired from the second terminal section group 7b in a direction perpendicular to the direction in which the pixel circuits 2 are arranged and opposite to the direction in which the data lines 3 are wired from the first terminal section group 7a. Therefore, a space is formed in an area on the opposite side of the first terminal section group 7a in the direction in which the data lines 3 are wired from the first terminal section group 7a (in FIG. 3, an area below the first terminal section group 7a). The protective element 10, such as an ESD protection element, is generally significantly large in size compared with a transistor or the like in the pixel circuit 2 and thus requires a large area to be disposed. In the present embodiment, however, an increase in size may be reduced by disposing the protective element 10 in this space.

In the present embodiment, the wiring which constitutes the short ring 9 is wired from the first terminal section group 7a and the second terminal section group 7b in the direction perpendicular to the direction in which the pixel circuits 2 are arranged and the direction in which the data lines 3 are wired from the first terminal section group 7a. Generally, since the wiring which constitutes the short ring 9 is a wiring layer of low resistance, the wiring is formed in the same layer as a wiring layer which constitutes the protective element 10. Therefore, since it is difficult to dispose the short ring 9 and the protective element 10 at the same location, it is desirable not to form the wiring which constitutes the short ring 9 in the area in which the protective element 10 is disposed. However, in a case in which wiring of the short ring 9 is formed on a wiring layer which does not interfere with the protective element 10 at all, the short ring 9 and the protective element 10 may be disposed in an overlapped manner. Therefore, the direction in which the wiring that constitutes the short ring 9 is not particularly limited.

Image Forming Apparatus

Figure 4:
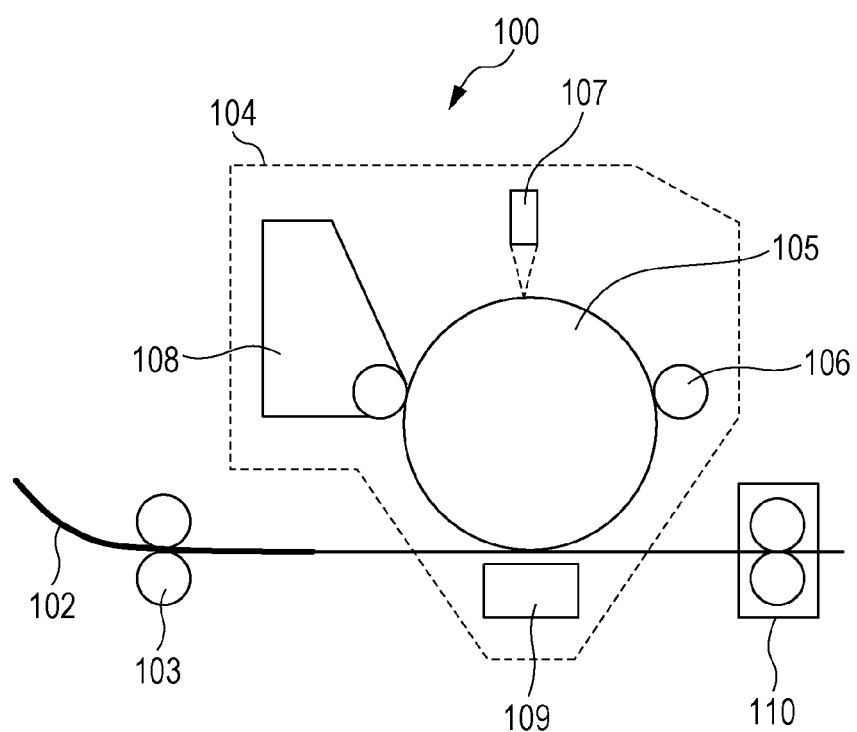
FIG. 4 is a schematic diagram of an image forming apparatus equipped with a light source for exposure of the present invention.

An embodiment of an image forming apparatus equipped with an exposure head in which the light source for exposure of the present invention is used will be described with reference to FIG. 4. An image forming apparatus 100 includes a recording unit 104 equipped with a photoconductive drum 105, a charging unit 106, an exposure head 107 provided with the light source for exposure of the present invention, a developing unit 108 and a transfer unit 109. The image forming apparatus 100 further includes a conveying roller 103 and a fusing unit 110. The exposure head 107 is constituted by the light source for exposure and an image formation unit provided on the light source for exposure for forming, on the photoconductive drum 105, an image of light emitted from light-emitting elements of the light source for exposure.

In the recording unit 104, a surface of cylindrical photoconductive drum 105 is first charged uniformly in the charging unit 106, the exposure head 107 emits light in accordance with data, and an electrostatic latent image is formed on the photoconductive drum 105. The electrostatic latent image may be controlled depending on an amount of exposure (illumination and time) of the exposure head 107. Next, in the recording unit 104, toner is made to adhere to the electrostatic latent image by the developing unit 108 and the toner which has adhered to the electrostatic latent image is transferred to a sheet 102 by the transfer unit 109. In this manner, toner is fixed to the sheet 102, by the fusing unit 110, to which image data has been transferred by the recording unit 104 and the sheet 102 is then discharged. The timing at which the sheet 102 is conveyed to the recording unit 104 by the conveying roller 103 may be determined suitably. Although a monochrome image forming apparatus equipped with a single recording unit 104 has been described in the present embodiment, the image forming apparatus of the present invention is not limited to the same. A color image forming apparatus equipped with plural recording units 104 may also be used.

According to the present invention, parasitic capacitance of the data line may be decreased substantially. Therefore, the exposure head may be driven at a high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181015, filed Sep. 2, 2013, which is hereby incorporated by reference herein in its entirety.

What is claimed is:

1. A light source for exposure, comprising:
   a circuit section which includes plural pixel circuits arranged in one direction, a scanning circuit configured to output a scanning signal, and a scanning line configured to supply the plural pixel circuits with the scanning signal;
   plural light-emitting elements being connected to the plural pixel circuits and being included in a light-emitting element group; and plural data lines being configured to supply the plural pixel circuits with a data signal via lead wires and being included in a data line group, wherein the data line group, the light-emitting element group and the circuit section are arranged in this order, in a direction perpendicular to a direction in which the plural pixel circuits are arranged.

2. The light source for exposure according to claim 1, wherein the plural pixel circuits and the scanning circuit are arranged in this order and arranged from the side of the light-emitting element group, in the direction perpendicular to the direction in which the plural pixel circuits are arranged.

3. The light source for exposure according to claim 1, wherein the plural data lines are wired in the direction in which the plural pixel circuits are arranged and the lead wires are wired in the direction perpendicular to the direction in which the plural pixel circuits are arranged.

4. The light source for exposure according to claim 1,
wherein the circuit section further includes plural power supply wires configured to supply the plural pixel circuits and the light-emitting elements with a power supply voltage, and
wherein in each of the plural pixel circuits, a first power supply wire to which a first voltage is applied among the plural power supply wires is disposed on the side of the scanning circuit.

5. The light source for exposure according to claim 4,
wherein a length of the data line group in the direction perpendicular to the direction in which the plural pixel circuits are arranged is longer than a length of the pixel circuits in the direction perpendicular to the direction in which the plural pixel circuits are arranged,
the length of the data line group is longer than a length of the scanning circuit in the direction perpendicular to the direction in which the plural pixel circuits are arranged, and
the length of the data line group is longer than a length of the first power supply wire in the direction perpendicular to the direction in which the plural pixel circuits are arranged.

6. The light source for exposure according to claim 1, wherein each of the plural pixel circuits includes a driving transistor configured to supply the plural light-emitting elements with a driving current, and a selection transistor configured to supply the driving transistor with the data signal, the driving transistor being connected to a first power supply wire, and a gate electrode of the selection transistor being connected to the scanning line.

7. The light source for exposure according to claim 1, wherein the plural pixel circuits form plural blocks each of which is constituted by adjacent plural pixel circuits, and the scanning circuit scans the plural pixel circuits in block units.

8. The light source for exposure according to claim 1, further comprising:
a protective element connected to the scanning circuit, and plural terminal sections disposed adjacent to the plural pixel circuits, the plural terminal sections being arranged in a direction in which the plural pixel circuits are arranged,
wherein the plural terminal sections include a first terminal section group connected to the plural data lines and a second terminal section group connected to the scanning circuit, the first terminal section group being disposed on the side of the plural pixel circuits with respect to the second terminal section group;
wherein a signal line which connects the scanning circuit and the second terminal section group via the protective element is wired from the second terminal section group in a direction opposite to a direction in which the plural data lines are wired from the first terminal section group, and
wherein the protective element is disposed in an area on the opposite side of the first terminal section group in the direction in which the plural data lines are wired from the first terminal section group.

9. The light source for exposure according to claim 8, wherein wiring which constitutes a short ring is wired in the direction in which the data lines are wired from the first terminal section group, from the first terminal section group and second terminal section group.

10. An exposure head provided with the light source for exposure according to claim 1.

11. An image forming apparatus provided with the exposure head according to claim 10.

* * * * *